United States Patent
Cao et al.

(10) Patent No.: US 10,832,132 B2
(45) Date of Patent: Nov. 10, 2020

(54) DATA TRANSMISSION METHOD AND CALCULATION APPARATUS FOR NEURAL NETWORK, ELECTRONIC APPARATUS, COMPUTER-READABLE STORAGE MEDIUM AND COMPUTER PROGRAM PRODUCT

(71) Applicant: SHENZHEN INTELLIFUSION TECHNOLOGIES CO., LTD., Shenzhen (CN)

(72) Inventors: Qingxin Cao, Shenzhen (CN); Lea Hwang Lee, Shenzhen (CN); Wei Li, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/627,294

(22) PCT Filed: Mar. 16, 2018

(86) PCT No.: PCT/CN2018/079372
§ 371 (c)(1),
(2) Date: Dec. 29, 2019

(87) PCT Pub. No.: WO2019/127925
PCT Pub. Date: Jul. 4, 2019

(65) Prior Publication Data
US 2020/0167646 A1    May 28, 2020

(30) Foreign Application Priority Data
Dec. 29, 2017 (CN) .......................... 2017 1 1484341

(51) Int. Cl.
*G06N 3/08* (2006.01)
*G06F 12/02* (2006.01)

(52) U.S. Cl.
CPC ............. *G06N 3/08* (2013.01); *G06F 12/023* (2013.01); *G06F 2212/1016* (2013.01)

(58) Field of Classification Search
CPC ............................................... G06F 2207/4824
(Continued)

(56) References Cited

U.S. PATENT DOCUMENTS

| 5,956,703 A | 9/1999 | Turner et al. |
| 2018/0189651 A1* | 7/2018 | Henry .................. G06N 3/0454 |

FOREIGN PATENT DOCUMENTS

| CN | 105320495 A | 2/2016 |
| CN | 106875013 A | 6/2017 |

OTHER PUBLICATIONS

International Search Report issued in corresponding International application No. PCT/CN2018/079372, dated Oct. 10, 2018.
(Continued)

*Primary Examiner* — David R Vincent

(57) ABSTRACT

Provided are a data transmission method for a neural network, and a related product. The method includes the following steps: acquiring a weight specification of weight data stored in a memory, comparing the weight specification with a specification of a write memory in terms of size and determining a comparison result; according to the comparison result, dividing the write memory into a first-in first-out write memory and a multiplexing write memory; according to the comparison result, determining data reading policies of the first-in first-out write memory and the multiplexing write memory; and according to the data reading policies, reading weights from the first-in first-out write memory and the multiplexing write memory and loading the weights to a calculation circuit. The technical solution provided by the present application has the advantages of low power consumption and short calculation time.

9 Claims, 4 Drawing Sheets

(58) Field of Classification Search
USPC .................................................... 706/15, 45
See application file for complete search history.

(56) References Cited

OTHER PUBLICATIONS

Written Opinion of the International Searching Authority for No. PCT/CN2018/079372.
Initial publication with International Search Report for No. WO 2019/127925 A1, dated Jul. 4, 2019.

* cited by examiner

DATA TRANSMISSION METHOD AND CALCULATION APPARATUS FOR NEURAL NETWORK, ELECTRONIC APPARATUS, COMPUTER-READABLE STORAGE MEDIUM AND COMPUTER PROGRAM PRODUCT

CROSS-REFERENCE TO RELATED APPLICATIONS

This application claims the benefit of priority from Chinese Patent Application NO. 201711484341.0 entitled "DATA TRANSMISSION METHOD FOR NEURAL NETWORK AND RELATED PRODUCTS" and filed on Dec. 29, 2017, the content of which is hereby incorporated in its entire by reference.

FIELD

The present disclosure relates to the field of artificial intelligence (AI) technology, and more particularly, to a data transmission method and a calculation apparatus for a neural network, an electronic apparatus, a computer-readable storage medium and a computer program product.

BACKGROUND

With the increasing maturity of artificial intelligence technology, application scenarios and product demands of all walks of life show explosive growth, which makes applications of artificial intelligence based on deep learning algorithms widely used. However, in the process of hardware and chip implementation, the deep learning algorithms generally encounter a key problem: a parameter value of network model, namely WEIGHT, is generally at the level of tens of thousands bits to megabits, that is, the WEIGHT generally ranges from tens of thousands of bit to megabits. So how to effectively load the WEIGHT to a calculation circuit for calculation has become an urgent problem to be solved at present. The existing technical solution cannot realize fast transmission for weight data, which will affect calculation performance, prolong calculation time and reduce user experience.

SUMMARY

Embodiments of the present disclosure provide a data transmission method for a neural network and related products, which can reuse weight data for many time, reduce weight loading times, save data transmission bandwidth and save calculation time.

A first aspect, one embodiment of the present disclosure provides a data transmission method for a neural network, the data transmission method includes the following steps:

acquiring a weight specification of weight data stored in a memory, comparing the weight specification with a specification of a write memory in terms of size, to obtain a comparison result;

dividing the write memory into a first-in first-out write memory and a multiplexing write memory, according to the comparison result;

determining data reading policies of the first-in first-out write memory and the multiplexing write memory, according to the comparison result;

reading weights from the first-in first-out write memory and the multiplexing write memory, according to the data reading policies, and loading the weights to a calculation circuit.

Optional, the data reading policies include: a first-in first-out mode or a combination mode of first-in first-out and repeated reading.

Optional, the step of dividing the write memory into a first-in first-out write memory and a multiplexing write memory, according to the comparison result, and the step of determining data reading policies of the first-in first-out write memory and the multiplexing write memory, according to the comparison result, include:

if the comparison result is: the weight specification<=the specification of the write memory, configuring a start address of the first-in first-out write memory to be zero, and an end address of the first-in first-out write memory to be the maximum address value of the write memory;

determining a first direct memory and a second direct memory been in a first-in first-out mode;

writing the weights to the memory by the first direct memory, detecting a first-in first-out operation level by the second direct memory after the second direct memory is started, and reading the weights from the write memory and transmitting the weights to the calculation circuit by the second direct memory, when the first-in first-out operation level changes from a high level to a low level.

Optional, the step of dividing the write memory into a first-in first-out write memory and a multiplexing write memory, according to the comparison result, and the step of determining data reading policies of the first-in first-out write memory and the multiplexing write memory, according to the comparison result, include:

if the comparison result is: the weight specification>the specification of the write memory, dividing the weights into first part weights and second part weights;

placing the first part weights in an area of the multiplexing write memory, wherein, the area of the multiplexing write memory is a write memory area that is repeatedly read and used by the second direct memory;

starting a first task and a second task by the second direct memory, wherein, the first task is configured to repeatedly acquire the first part weights from the area of the multiplexing write memory, and the second task is configured to dynamically load the second part weights from the memory through the area of the first-in first-out write memory by use of a first-in first-out mode;

performing calculation by use of the first part weights firstly and then performing calculation by use of the second part weights by the calculation circuit.

A second aspect, one embodiment of the present disclosure provides a calculation apparatus, and the calculation apparatus includes: a memory, a first direct memory, a write memory, a second direct memory, a calculation circuit, and a control circuit; wherein, the first direct memory is configured to write weights stored in the memory to the write memory;

the control circuit is configured to acquire a weight specification of weight data stored in the memory, compare the weight specification with a specification of the write memory in terms of size, to obtain a comparison result, divide the write memory into a first-in first-out write memory and a multiplexing write memory, according to the comparison result, and determine data reading policies of the first-in first-out write memory and the multiplexing write memory, according to the comparison result;

the second direct memory is configured to read weights from the first-in first-out write memory and the multiplexing write memory, according to the data reading policies, and load the weights to the calculation circuit.

Optional, the data reading policies include: a first-in first-out mode or a combination mode of first-in first-out and repeated reading.

Optional, if the comparison result is: the weight specification<=the specification of the write memory, the control circuit is further configured to configure a start address of the first-in first-out write memory to be zero, and an end address of the first-in first-out write memory to be the maximum address value of the write memory; determine a first direct memory and a second direct memory been in a first-in first-out mode;

the second direct memory detects a first-in first-out operation level after the second direct memory is started, and when the first-in first-out operation level changes from a high level to a low level, the second direct memory reads the weights from the write memory and transmits the weights to the calculation circuit.

Optional, if the comparison result is: the weight specification>the specification of the write memory, the control circuit is further configured to divide the weights into first part weights and second part weights;

the first direct memory is specifically configured to place the first part weights in an area of the multiplexing write memory and cache the second part weights in an area of the first-in first-out write memory;

the area of the multiplexing write memory is a write memory area that is repeatedly read and used by the second direct memory, and the area of the first-in first-out write memory is a write memory area that is dynamically loaded by the second direct memory;

the second direct memory is configured to start a first task and a second task, wherein the first task is used to repeatedly acquire the first part weights from the area of the multiplexing write memory, and the second task is used to dynamically load the second part weights from the memory through the area of the first-in first-out write memory by use of the first-in first-out mode, and the calculation circuit is configured to perform calculation by use of the first part weights firstly, and then perform calculation by use of the second part weights.

A third aspect, one embodiment of the present disclosure provides an electronic apparatus, and the electronic apparatus includes the calculation apparatus provided in the second aspect.

A fourth aspect, one embodiment of the present disclosure provides a computer-readable storage medium, on which computer programs are stored for electronic data interchange, the computer programs enable a computer to perform the data transmission method provided in the first aspect.

A fifth aspect, one embodiment of the present disclosure provides a computer program product, including a non-transient computer-readable storage medium in which computer programs are stored, and the computer programs enable a computer to perform the data transmission method provided in the first aspect.

Embodiments of the present disclosure have the following beneficial effects:

as can be seen from the above technical solution, the present disclosure can compare the weight specification with the specification of the write memory in terms of size to obtain the comparison result, and then on the basis of the comparison result determine how to divide the write memory and determine the data reading policies, so that the data reading policies of weight can be dynamically adjusted according to the weight specification. Thus, the technical solution provided by the present disclosure can improve reading speed, reduce calculation time, save power consumption and improve user experience.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the disclosure, for persons of ordinary skills in this field, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. Based on the embodiments of the disclosure, all other embodiments obtained by persons of ordinary skills in this field without creative work shall fall within the protection scope of the present disclosure.

The terms "first", "second", "third" and "fourth" in specification, claims and drawings of the present disclosure are used to distinguish different objects, but not used to describe a particular sequence. In addition, the terms "include" and "have" and any deformation thereof are intended to cover exclusive inclusions. For example, a process, method, system, product or device that contains a series of steps or units is not only limited to listed steps or units, but optionally includes steps or units not listed, or optionally includes other inherent steps or units for the processes, methods, products or devices.

The reference to "embodiments" in present disclosure means specific characteristics, structures or characters described in the embodiments can be included in at least one embodiment of the present disclosure. The term "embodiment" shown in various positions in the specification does not necessarily refer to the same embodiment, also does not refer to the embodiments that are independent and exclusive embodiments with other embodiments or alternative embodiments. It can be understood both explicitly and implicitly by persons of ordinary skills in this field that the embodiments described herein can be combined with other embodiment.

An electronic apparatus described in the embodiments of the disclosure may include: a server, a smart camera, a smart phone (such as an Android phone, a iOS phone, a Windows Phone, etc.), a tablet computer, a handheld computer, a laptop, a mobile internet device (MID) or a wearable device, etc., which is only an example, not exhaustive, and is not limited the electronic apparatus listed above. For the sake of description, the electronic apparatus mentioned above is referred to as a User equipment (UE), a terminal or an electronic device in the following embodiments. Of course, in practical applications, the above-mentioned electronic apparatus is not limited to the above realization forms. For example, it can also include: an intelligent vehicle-mounted terminal, a computer equipment, and so on.

Figure 1:
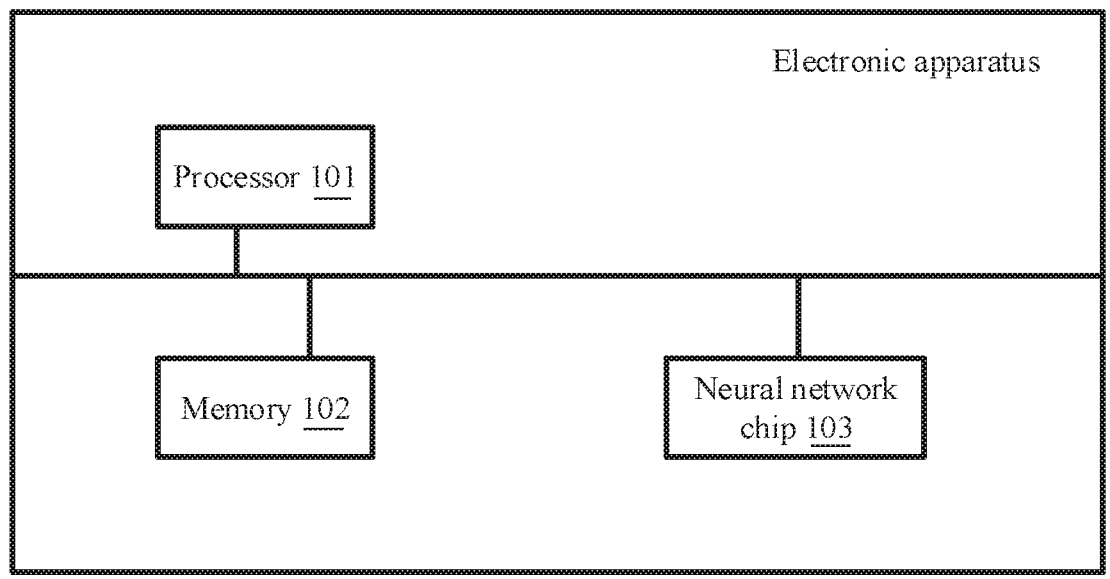
FIG. 1 is a block diagram of an electronic apparatus provided in one embodiment of the present disclosure.

Referring to FIG. 1, FIG. 1 is a block diagram of an electronic apparatus provided in one embodiment of the present disclosure. The electronic apparatus can include: a processor 101, a memory 102 and a neural network chip 103. The processor 101 is electrically connected to the memory 102 and the neural network chip 103. Specifically, in an optional technical solution, the neural network chip 103 can be integrated into the processor 101. The memory 102 can include: a flash disk, a Read-Only Memory (ROM), a Random Access Memory (RAM), etc. The technical solution provided by the present disclosure does not limit whether the neural network chip 102 is set up separately or integrated into the processor 101. That is, the neural network chip 102 can be set up separately or be integrated into the processor 101, which is not limited in the technical solution of the present disclosure.

Figure 2:
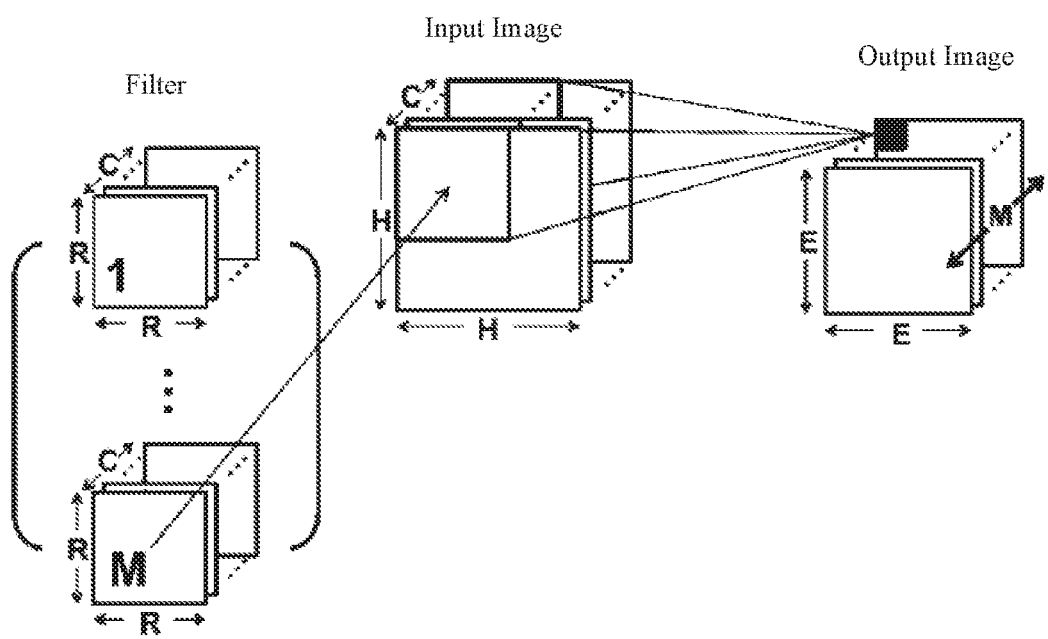
FIG. 2 is a schematic diagram of a neural network model provided in one embodiment of the present disclosure.

Referring to FIG. 2, which provides a schematic diagram of a neural network model provided in one embodiment of the present disclosure. As shown in FIG. 2, values of WEIGHTS of each neural network model can also be referred to as weights, and the weights basically determine a computational complexity of the neural network model. Inputs of the neural network model includes two channels, one is the weight (such as Filter shown in FIG. 2), the other is input data (such as Input Image shown in FIG. 2). One output of the neural network model is output data (such as Output Image shown in FIG. 2). As for the weights, since the weights are generally multi-dimensional data, and the weights generally range in size from tens of Kilobytes (KB) to Megabyte (MB). Therefore, how to effectively load the weights and reduce waiting time of a calculation circuit has become an important problem to be solved by the neural network at present.

In one embodiment, the neural network model can include many layers of calculations. Each layer of calculation may include, for example, a matrix multiplication by matrix operation, a convolution operation, and other complex operations. A calculation solution of the neural network model is introduced in the following contents. In detail, the calculation solution be divided into several layers of calculations, and each layer of calculation is an operation between the input data and the weight of a corresponding layer, namely, an operation between the Input Image and the Filter as shown in FIG. 2. The operation may include, but not limited to: convolution operations, matrix multiplication by matrix operations, and so on. The schematic diagram shown in FIG. 2 can be a convolution operation at a certain layer of the neural network model, specifically:

the Filters represent the weights in the neural network model;

the Input Image represents the input data of the present disclosure;

the Output Image represents the output data of the present disclosure;

each C0 can be obtained by adding all products of each input data being multiplied by a corresponding weight.

A number of the weights is CI NUM*C0 NUM, and each weight is a two-dimensional matrix data structure.

Figure 3:
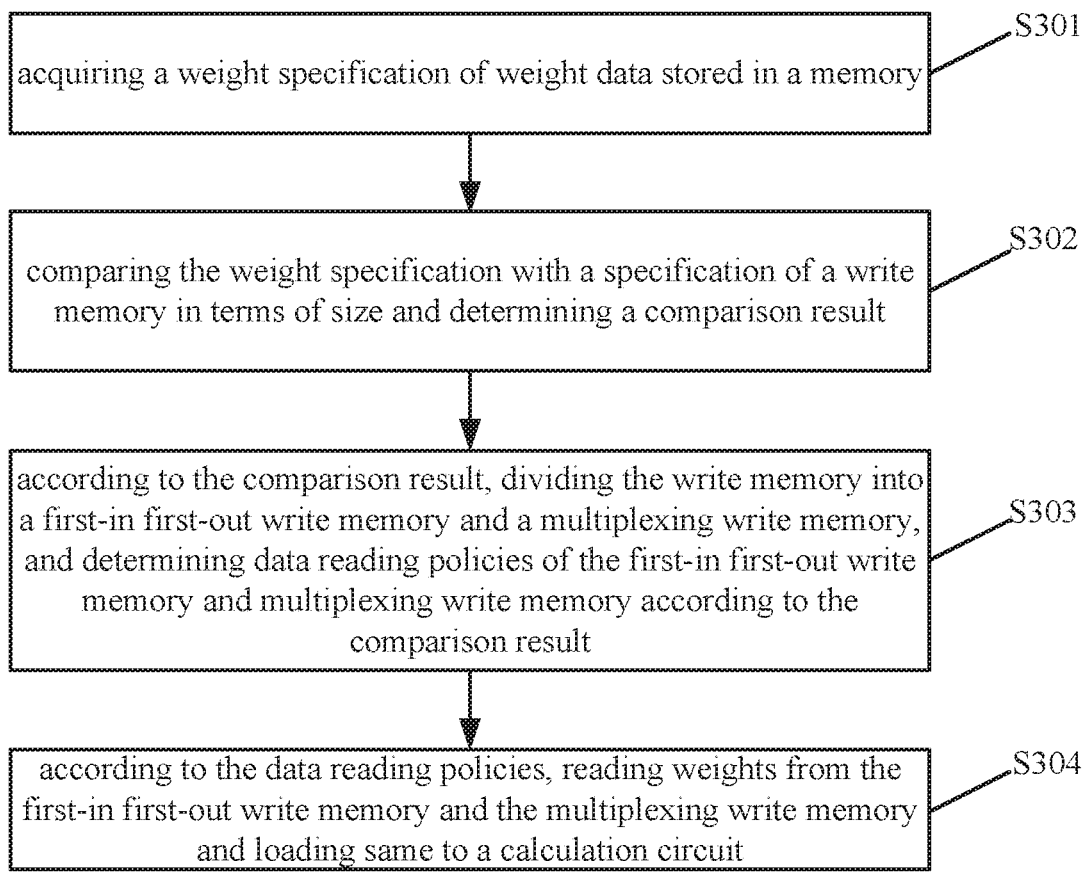
FIG. 3 is a flowchart of a data transmission method for a neural network provided in one embodiment of the present disclosure.
Figure 4:
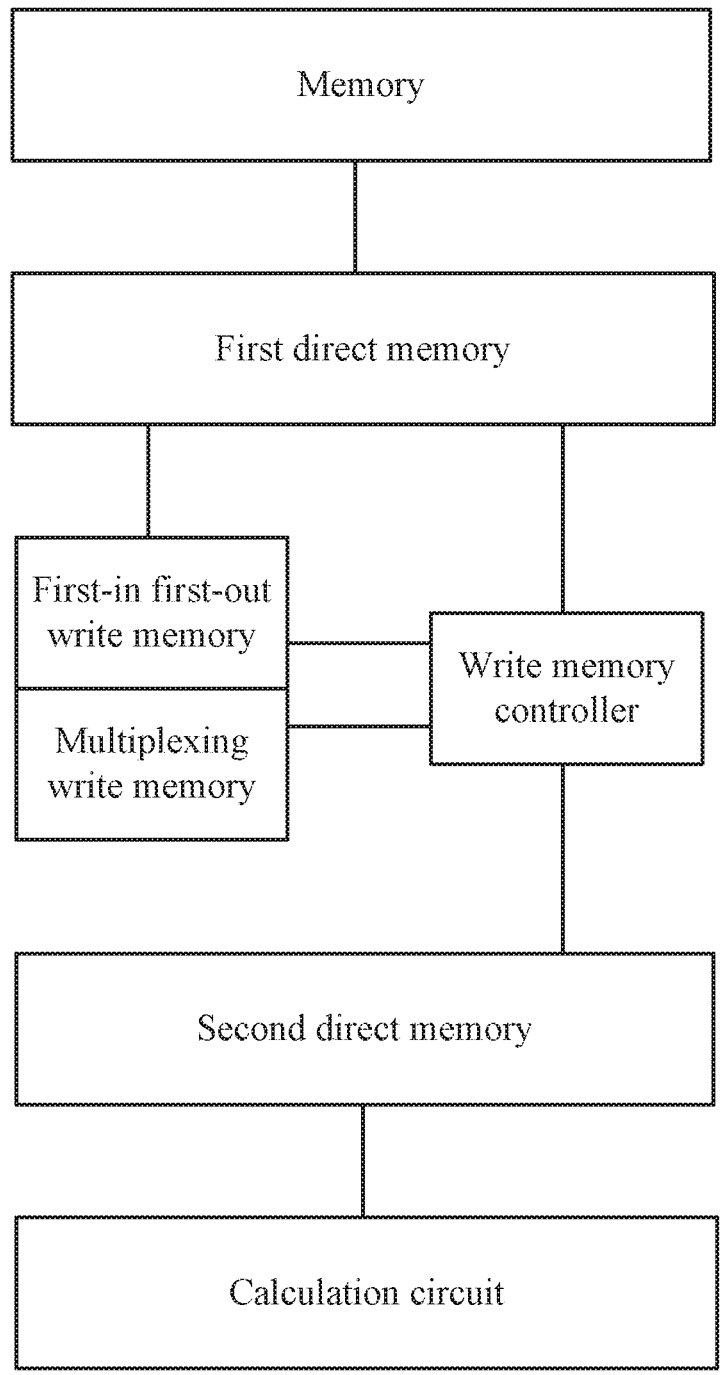
FIG. 4 is a block diagram of a calculation apparatus provided in one embodiment of the present disclosure.

Referring to FIG. 3, FIG. 3 is a flowchart of a data transmission method for a neural network provided in one embodiment of the present disclosure, which can be executed by a neural network chip or a processing chip as shown in FIG. 4. A chip structure in FIG. 4 includes:

a memory, such as a double rate synchronous dynamic RAM (DDR), configured to load parameters of a neural network, when a system is powered up;

a first direct memory, configured to load and transmit the parameters of the neural network from the DDR to a cache of a write memory (WM);

a second direct memory, configured to obtain the parameters of the neural network from the cache of the write memory and send the parameters to a calculation circuit;

the calculation circuit, configured for calculation;

a first-in first-out write memory: a First Input First Output (FIFO) area of the write memory;

a multiplexing write memory: a non-FIFO area of the write memory;

a write memory controller: a controller and a arbiter of the write memory.

In a multiplexing write memory mode, a handshake granularity between the first direct memory and the second direct memory is a task-level, which can be described as follows:

after the first direct memory writes all the data that needs to be transferred by a task into the multiplexing write memory, and transmits the data to the second direct memory through an interrupt; the second direct memory begins to read the data. Of course, there is a direct hardware handshake between the first direct memory and the second direct memory, which does not require software synchronization.

In the multiplexing write memory mode, a maximum amount of data that can be transferred, is equal to a specification of the write memory, when an amount of data is greater than the specification of the write memory, data that is transferred subsequently will overwrite data transferred previously.

In a first-in first-out write memory mode, the handshake granularity between the first direct memory and the second direct memory is in a read-write address pointer level, which can be described as follows:

the first direct memory is configured to write data; the second direct memory is configured to detect whether there is any line of valid data written into the first direct memory, and begin to read data, without waiting for the first direct memory to write all the data, when the second direct memory detects there is any line of valid data written into the first direct memory.

In the first-in first-out write memory mode, data with amount greater than the specification of the write memory can be transferred only by use of a limited storage space, and the second direct memory and the first direct memory performs handshake by use of a first-in first-out operation level, to ensure that the data is not overwritten and lost.

The data transmission method for the neural network as shown in FIG. 3 at least includes the following steps:

step S301: acquiring a weight specification of weight data stored in a memory;

step S302: comparing the weight specification with a specification of a write memory in terms of size, to obtain a comparison result;

step S303: dividing the write memory into a first-in first-out write memory and a multiplexing write memory, and determining data reading policies of the first-in first-out write memory and multiplexing write memory, according to the comparison result;

step S304: reading weights from the first-in first-out write memory and the multiplexing write memory, according to the data reading policies, and loading the weights to a calculation circuit.

The data transmission method for the neural network provided in the present disclosure can compare the weight specification with the specification of the write memory in terms of size, to obtain the comparison result, and then on the basis of the comparison result determine how to divide the write memory and determine the data reading policies, so that the data reading policies of weight can be dynamically adjusted according to the weight specification. Thus, the technical solution provided by the present disclosure can improve reading speed, reduce calculation time, save power consumption and improve user experience.

For example, the comparison result can be: the weight specification<=the specification of the write memory, namely, the weight specification being less than or equal to the specification of the write memory.

Based on the above comparison result, the weights can be cached in the write memory for repeated use, and only a first task is performed, the weights need to be loaded once from the DDR, to perform a first load.

A start address of the first-in first-out write memory can be configured to be zero, and an end address of the first-in first-out write memory can be configured to the maximum address value of the write memory.

The first direct memory and the second direct memory can be configured as the first-in first-out mode by use of software configuration, and the first direct memory and the second direct memory are started.

The first direct memory can transmit all the weights into the first-in first-out write memory and the multiplexing write memory.

After the second direct memory is started, the second direct memory first waits for the first-in first-out operation level to be pulled down. Once the first direct memory starts to write data, the second direct memory starts to validly read the data, and transmits the data to the calculation circuit, and the calculation circuit starts calculation.

After the first load is completed, the following tasks do not need to be reloaded from the DDR, and the second direct memory only needs to read and use the data repeatedly, which reduces the number of times that the task is reloaded from the DDR, therefore saving transmission bandwidth.

In this scenario, compared to the multiplexing write memory mode, in the first-in first-out write memory mode, the first task can be started earlier. As long as a valid parameter is written to the first direct memory, the second direct memory/the calculation circuit can start to operate. In the multiplexing write memory mode, the second direct memory/the calculation circuit does not start to operate, until the first direct memory has finished transferring all the weights.

For example, the comparison result can be: the weight specification>the specification of the write memory, namely, the weight specification being greater than the specification of the write memory.

At this point, all the weights cannot be cached in the write memory. When the weights need to be reused, all the weights cannot be reused. The existing technical solution needs to load the weights dynamically from the DDR every time, which has a great impact on bandwidth demand and performance.

The write memory is divided into two areas for use, namely, the first-in first-out write memory and the multiplexing write memory. The weights are divided into two parts: first part weights and second part weights. The combination of the first part weights and the second part weights is the weights.

The first part weights are positioned in the area of the multiplexing write memory, and are only loaded once from the DDR, and are repeatedly read and used by the second direct memory.

The second part weights are dynamically loaded to the area of the first-in first-out write memory. The second part weights need to be dynamically loaded from the DDR every time.

At the beginning of each calculation task, the second direct memory directly acquires the first part weights from the area of the multiplexing write memory, without any wait. At the same time, the second part weights are loaded by the first-in first-out write memory.

Therefore, each task of the second direct memory will activate two second direct memory tasks respectively: task 1 and task 2. The task 1 is a non first-in first-out mode, which is responsible for acquiring the first part weights from the area of the multiplexing write memory. The task 2 is the first-in first-out mode, which is responsible for acquiring the second part weights from the first-in first-out write memory.

The larger the area of the multiplexing write memory is, the more the first part weights can be reused, and the more the bandwidth is saved. Of course, in practice use, a reasonable first-in first-out specification of the write memory can be set in combination with the bandwidth of the DDR. The first-in first-out specification of the write memory can resist jitter and imbalance of the bandwidth of the DDR, and try to make the first-in first-out write memory non-empty.

The following is an example of an actual weight specification to illustrate the specific solution.

Assuming that the weight specification=1.2 times of the specification of the write memory, that is, assuming that the weight specification is equal to 1.2 times of the specification of the write memory, then 80% area of the write memory is set to the multiplexing write memory, and the remaining 20% area of the write memory is set to the first-in first-out write memory.

Then, the multiplexing write memory can store 66.7% of the weights, that is, the first part weights are equal to ⅔ of the weights.

The remaining 33.3% weights are loaded in the first-in first-out write memory, that is, the second part weights are determined to be equal to ⅓ of the weights.

Every time a task is started, the second direct memory reads the first part weights firstly. Specifically, the second direct memory reads parameters of the first part weights stored in the area of the multiplexing write memory firstly, and transmits the first part weights to the calculation circuit for calculation. At the same time, the remaining weights are dynamically loaded in the first-in first-out write memory, and then the second direct memory reads the second part weights and transmits the second part weights to the calculation circuit for calculation.

Therefore, each task can save 66.7% of the bandwidth, and this ratio can be adjusted and optimized according to different model conditions and bandwidth conditions.

Therefore, the technical solution provided by this disclosure has the following advantages: the write memory with small storage capacity, can store model parameters of various sizes; the multiplexing write memory can be reused, which can save bandwidth effectively and give prefetch time for the first-in first-out write memory; and the first-in first-out write memory can perform the hardware handshake with a valid data granularity, which can completely eliminate wait overhead of weight parameters.

Handshake mechanism, namely communication modes, between various hardware is described below. Of course, the following handshake mechanism is only for illustration. It should be understood that the embodiments of this disclosure are not limited to the following handshake mechanism.

A handshake mechanism between the write memory and the first direct memory/the second direct memory can includes:

handshake signals: a request signal (REQ), a received signal (READY), a valid indication (VALID).

The request signal (REQ) indicates a read and write request signal, which is valid at a high level (such as, logic 1).

The received signal==1 indicates that the write memory can receive the request signal; the received signal==0 indicates that the write memory cannot receive the request signal at present.

The valid indication indicates a read and write data valid indication, which is valid at a high level (such as, logic 1).

A handshake mode between the write memory controller and the first direct memory is as follows:

a request signal is transmitted from the first direct memory to the write memory controller;

the write memory controller provides a received signal according to arbitration condition;

if the received signal==0, then the first direct memory needs to keep a current request signal unchanged until the received signal==1;

if the received signal==1, then the first direct memory can continue to send a next request signal;

when the data is written to the memory, the write memory controller will return a valid indication to the first direct memory;

the first direct memory receives the valid indication, and can determine that the data has been written to the memory according to the valid indication.

A handshake mode between the write memory and the second direct memory is as follows:

a request signal is transmitted from the second direct memory to the write memory controller;

the write memory controller provides the received signal according to the arbitration condition;

if the received signal==0, the second direct memory needs to keep the current request signal unchanged until the received signal==1;

if the received signal==1, the second direct memory can continue to send a next request signal;

when the data is ready, the write memory controller will return a valid indication signal to the second direct memory;

the second direct memory acquires valid data when receiving the valid indication signal.

A hardware handshake mode for the area of the first-in first-out write memory is as follows:

the first direct memory and the second direct memory are configured in a first-in first-out mode by software;

the write memory controller is configured to synthetically arbitrate the request signal of the first direct memory/the second direct memory; the area of the first-in first-out write memory and the write memory controller also need to additionally iterate an empty full arbitration logic of first-in first-out;

when the write memory controller detects that the first-in first-out operation level is pulled up, the received signal is set to 0, namely, the received signal=0, the write memory controller refuses to receive a new request signal from the first direct memory until the first-in first-out operation level is pulled down;

when the write memory controller detects that the first-in first-out operation level is pulled up, the received signal is set to 0, namely, the received signal=0, the write memory controller refuses to receive a new request signal from the second direct memory until the first-in first-out operation level is pulled down (i.e., from a high level to a low level);

the first-in first-out write memory is empty by default; when the second direct memory initiates a read access firstly, because the first-in first-out operation level is valid, and the received signal==0, according to a handshake protocol, the second direct memory is required to keep the request signal on a bus all the time; until the first direct memory is written validly, the first-in first-out operation level is pulled down, and the received signal=1, then the second direct memory begins to read the valid data;

if the first direct memory continues to write data, and the second direct memory reads data relatively late or slow, resulting in the first-in first-out operation level to be pulled up, then according to the handshake protocol, the first direct memory is required to keep the current request signal on the bus all the time; until the second direct memory reads the data, the first-in first-out operation level is pulled down, and the received signal=1, then the first direct memory can continue to write the data.

In the first-in first-out mode, the handshake granularity of the second direct memory and the first direct memory is a valid data, and the second direct memory and the first direct memory can form a pipeline access of the handshake granularity, which can reduce waiting cost of software scheduling and parameter transfer.

Figure 5:
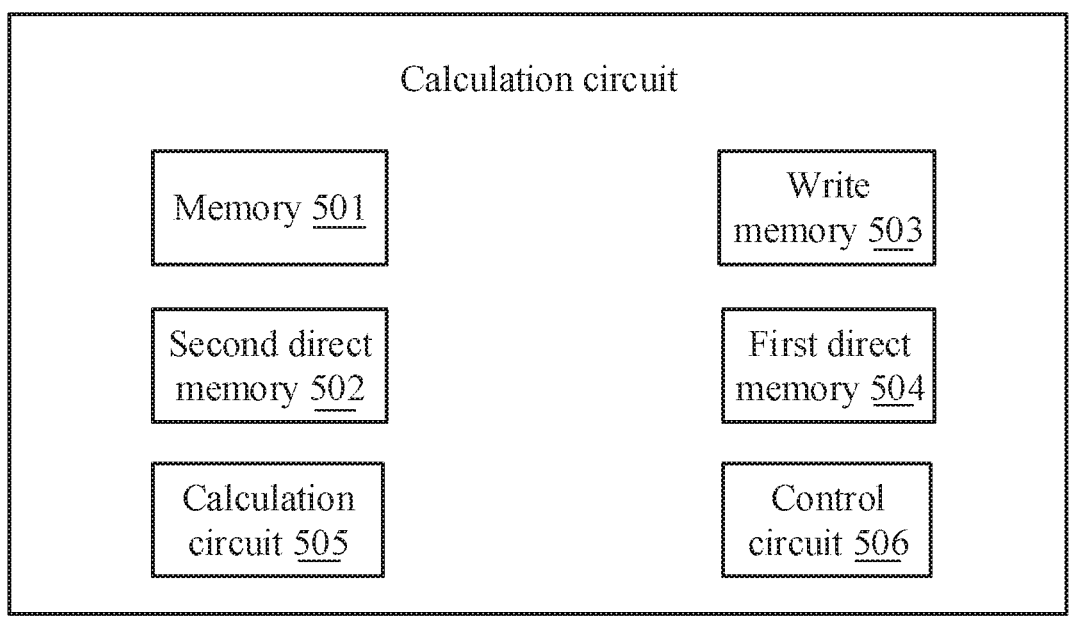
FIG. 5 is a block diagram of a calculation apparatus provided in another embodiment of the present disclosure.

Referring to FIG. 5, FIG. 5 is a block diagram of a calculation apparatus provided in another embodiment of the present disclosure. The calculation apparatus includes: a memory 501, a first direct memory 502, a write memory 503, a second direct memory 504, a calculation circuit 505, and a control circuit 506.

The first direct memory 502 is configured to write weights stored in the memory 501 to the write memory 503.

The control circuit 506 is configured to acquire a weight specification of weight data stored in the memory 501, compare the weight specification with a specification of the write memory 503 in terms of size, to obtain a comparison result, divide the write memory 503 into a first-in first-out write memory and a multiplexing write memory according to the comparison result, and determine data reading policies of the first-in first-out write memory and the multiplexing write memory, according to the comparison result.

The second direct memory 504 is configured to read weights from the first-in first-out write memory and the multiplexing write memory, according to the data reading policies, and load the weights to the calculation circuit 505.

In one embodiment, the data reading policies can include: a first-in first-out mode or a combination mode of first-in first-out and repeated reading.

In one embodiment, the control circuit 506 is further configured to, for example, when the comparison result is: the weight specification<=the specification of the write memory 503, configure a start address of the first-in first-out write memory to be zero, and an end address of the first-in first-out write memory to be the maximum address value of the write memory 503, and determine the first direct memory 504 and the second direct memory 502 been in a first-in first-out mode.

After the second direct memory 502 is started, the second direct memory 502 detects the first-in first-out operation level, and when the first-in first-out operation level changes from a high level to a low level, the second direct memory 502 reads the weights from the write memory 503 and transmits the weights to the calculation circuit 505.

In one embodiment, the control circuit 506 is further configured to, for example, when the comparison result is: the weight specification>the specification of the write memory 503, divide the weights into first part weights and second part weights.

The first direct memory 504 is specifically configured to place the first part weights in an area of the multiplexing write memory and cache the second part weights in an area of the first-in first-out write memory.

The area of the multiplexing write memory is a write memory area that can be repeatedly read and used by the second direct memory, and the area of the first-in first-out write memory is a write memory area that can be dynamically loaded by the second direct memory 502.

The second direct memory 502 is configured to start a first task and a second task. The first task is used to repeatedly acquire the first part weights from the area of the multiplexing write memory, and the second task is used to dynamically load the second part weights from the memory 501 through the area of the first-in first-out write memory by use of the first-in first-out mode.

The calculation circuit 505 is configured to perform calculation by use of the first part weights firstly, and then perform calculation by use of the second part weights.

Embodiments of the present disclosure further provide an electronic apparatus including the calculation apparatus mentioned above.

Embodiments of the present disclosure further provide a computer-readable storage medium in which computer programs are stored for electronic data interchange, and the computer programs enable a computer to perform some or all steps of any of the data transmission method for a neural network as described in method embodiments mentioned above.

Embodiments of the present disclosure further provide a computer program product including a non-transient computer-readable storage medium in which computer programs are stored, and the computer programs enable a computer to perform some or all steps of any of the data transmission method for a neural network as described in method embodiments mentioned above.

It should be noted that, for the method embodiments mentioned above, for a brief description, therefore, the method embodiments above are expressed as a series of action combinations, but a person having ordinary skills in the field should be aware that, this application is not limited by action sequences described above, because according to this application, some steps may be taken in other orders or simultaneously. Secondly, a person having ordinary skills in the field should also be aware that the embodiments described in the specification are optional embodiments and the actions and modules involved are not necessary for this application.

In the above embodiments, the description of each embodiment has its own emphasis, and parts not specified in one embodiment can be referred to the relevant description of other embodiments.

It should be understood that the disclosed apparatus in the embodiments provided by the present disclosure can be implemented in other ways. For example, the apparatus embodiments described above are merely schematic; for example, the division of the modules is merely a division of logical functions, which can also be realized in other ways; for example, multiple units or components can combined or integrated into another system, or some features can be ignored or not implemented. On the other hand, the coupling, direct coupling or communication connection shown or discussed may be achieved through some interfaces, indirect coupling or communication connection between devices or units may electrical or otherwise.

The modules described as separate parts may be or may not be physically separated, and the assembly units that serve as display modules may or may not be physical units, that is, they may be located in one place, or they may be distributed over multiple network units.

In addition, each functional module in each embodiment of the disclosure may be integrated into a processing unit, or each unit can also physically exist separately, or two or more units can also be integrated into a unit. The integrated unit mentioned above can be realized either in the form of hardware or in the form of hardware and software functional modules.

The integrated units may be stored in a computer-readable memory if implemented as a software program module and sold or used as a separate product. Based on this understanding, in nature, the technical solutions of the application or the part that contributes to the existing technology, or all or part of the technical solution can be manifested in the form of software products, the computer software products stored in a memory, including several instructions to make a computer equipment (such as a personal computer, a server or a network equipment, etc.) to perform all or part of the steps of the method described in each embodiment of this application. The aforementioned memory includes: a USB flash drive, a ROM (Read-Only Memory), a RAM (Random Access Memory), a mobile hard disk drive, a diskette or a CD-ROM or other storage medium that can store program codes.

A person having ordinary skills in the field can understand that all or part of steps in various method described in the embodiments of this application can be executed by corresponding hardware commanded by the programs. The programs can be stored in a computer-readable storage, and the computer-readable storage can include: a flash drive, a Read-Only Memory (ROM), a Random Access Memory (RAM), a disk or a compact disk (CD), etc.

Although the disclosure is described in combination with specific features and embodiments, it is evident that it can be modified and combined in various ways without departing from the spirit and scope of the disclosure. Accordingly, this specification and accompanying drawings are only exemplary descriptions of the disclosure as defined by the claims and are deemed to cover any and all modifications, variations, combinations or equivalents within the scope of the disclosure. The foregoing descriptions are merely exemplary embodiments of the present disclosure, but not intended to limit the protection scope of the present disclosure. Any variation or replacement made by persons of ordinary skills in the art without departing from the spirit of the present disclosure shall fall within the protection scope of the present disclosure. Therefore, the scope of the present disclosure shall be subject to be appended claims.

The invention claimed is:

1. A data transmission method for a neural network; comprising:
   acquiring a weight specification of weight data stored in a memory, comparing the weight specification with a specification of a write memory in terms of size, to obtain a comparison result;

dividing the write memory into a first-in first-out write memory and a multiplexing write memory, according to the comparison result;

determining data reading policies of the first-in first-out write memory and the multiplexing write memory, according to the comparison result;

reading weights from the first-in first-out write memory and the multiplexing write memory, according to the data reading policies, and loading the weights to a calculation circuit.

2. The data transmission method of claim 1, wherein, the data reading policies comprise:

a first-in first-out mode or a combination mode of first-in first-out and repeated reading.

3. The data transmission method of claim 1, the step of dividing the write memory into a first-in first-out write memory and a multiplexing write memory; according to the comparison result, and the step of determining data reading policies of the first-in first-out write memory and the multiplexing write memory; according to the comparison result, comprising:

if the comparison result is: the weight specification<=the specification of the write memory, configuring a start address of the first-in first-out write memory to be zero, and an end address of the first-in first-out write memory to be the maximum address value of the write memory;

determining a first direct memory and a second direct memory been in a first-in first-out mode;

writing the weights to the memory by the first direct memory, detecting a first-in first-out operation level by the second direct memory after the second direct memory is started, and reading the weights from the write memory and transmitting the weights to the calculation circuit by the second direct memory, when the first-in first-out operation level changes from a high level to a low level.

4. The data transmission method of claim 1, the step of dividing the write memory into a first-in first-out write memory and a multiplexing write memory; according to the comparison result, and the step of determining data reading policies of the first-in first-out write memory and the multiplexing write memory, according to the comparison result, comprising:

if the comparison result is: the weight specification>the specification of the write memory, dividing the weights into first part weights and second part weights;

placing the first part weights in an area of the multiplexing write memory, wherein, the area of the multiplexing write memory is a write memory area that is repeatedly read and used by the second direct memory;

starting a first task and a second task by the second direct memory, wherein, the first task is configured to repeatedly acquire the first part weights from the area of the multiplexing write memory, and the second task is configured to dynamically load the second part weights from the memory through the area of the first-in first-out write memory by use of a first-in first-out mode;

performing calculation by use of the first part weights firstly and then performing calculation by use of the second part weights by the calculation circuit.

5. A calculation apparatus, comprising: a memory, a first direct memory, a write memory, a second direct memory, a calculation circuit, and a control circuit; wherein, the first direct memory is configured to write weights stored in the memory to the write memory;

the control circuit is configured to acquire a weight specification of weight data stored in the memory, compare the weight specification with a specification of the write memory in terms of size, to obtain a comparison result, divide the write memory into a first-in first-out write memory and a multiplexing write memory, according to the comparison result, and determine data reading policies of the first-in first-out write memory and the multiplexing write memory, according to the comparison result;

the second direct memory is configured to read weights from the first-in first-out write memory and the multiplexing write memory, according to the data reading policies, and load the weights to the calculation circuit.

6. The calculation apparatus of claim 5, wherein, the data reading policies comprise:

a first-in first-out mode or a combination mode of first-in first-out and repeated reading.

7. The calculation apparatus of claim 5, wherein, if the comparison result is: the weight specification<=the specification of the write memory, the control circuit is further configured to configure a start address of the first-in first-out write memory to be zero, and an end address of the first-in first-out write memory to be the maximum address value of the write memory; determine the first direct memory and the second direct memory as a first-in first-out mode;

the second direct memory detects a first-in first-out operation level after the second direct memory is started, and when the first-in first-out operation level changes from a high level to a low level, the second direct memory reads the weights from the write memory and transmits the weights to the calculation circuit.

8. The calculation apparatus of claim 5, wherein, if the comparison result is: the weight specification>the specification of the write memory, the control circuit is further configured to divide the weights into first part weights and second part weights;

the first direct memory is specifically configured to place the first part weights in an area of the multiplexing write memory and cache the second part weights in an area of the first-in first-out write memory;

the area of the multiplexing write memory is a write memory area that is repeatedly read and used by the second direct memory, and the area of the first-in first-out write memory is a write memory area that is dynamically loaded by the second direct memory;

the second direct memory is configured to start a first task and a second task, wherein, the first task is used to repeatedly acquire the first part weights from the area of the multiplexing write memory, and the second task is used to dynamically load the second part weights from the memory through the area of the first-in first-out write memory by use of the first-in first-out mode; and the calculation circuit is configured to perform calculation by use of the first part weights firstly, and then perform calculation by use of the second part weights.

9. An electronic apparatus, comprising a calculation apparatus, the calculation apparatus comprising: a memory, a first direct memory, a write memory, a second direct memory, a calculation circuit, and a control circuit; wherein, the first direct memory is configured to write weights stored in the memory to the write memory;

the control circuit is configured to acquire a weight specification of weight data stored in the memory, compare the weight specification with a specification of the write memory in terms of size, to obtain a comparison result, divide the write memory into a first-in first-out write memory and a multiplexing write memory, according to the comparison result, and determine data reading policies of the first-in first-out write memory and the multiplexing write memory, according to the comparison result;

the second direct memory is configured to read weights from the first-in first-out write memory and the multiplexing write memory, according to the data reading policies, and load the weights to the calculation circuit.

\* \* \* \* \*